United States Patent [19]

Nagasawa et al.

[11] 3,907,777

[45] Sept. 23, 1975

[54] METHOD OF REMOVING VITAMIN $B_2$ FROM WHEY

[75] Inventors: Taro Nagasawa; Mamoru Tomita, both of Tokyo, Japan

[73] Assignee: Morinaga Milk Industry Co., Ltd., Tokyo, Japan

[22] Filed: Oct. 18, 1973

[21] Appl. No.: 407,581

[30] Foreign Application Priority Data

Mar. 9, 1973 Japan.................................. 48-27167

[52] U.S. Cl.............................. 260/211.3; 260/211
[51] Int. Cl.².......................................... C07H 19/06
[58] Field of Search......................... 260/708, 211.3

[56] References Cited
UNITED STATES PATENTS 2,768,221  10/1956  Findlay .............................. 260/708
3,221,008  11/1965  Wolf et al. ........................ 260/211.3

OTHER PUBLICATIONS

Duric, N. *Vit $B_{12}$ Isolation*, Chem. Abstracts, Vol. 73, 1970, paragraph 13110t.

*Laboratory Text–Org. Chem.*, Cason and Rapoport, page 21, Prentice–Hall, N.Y. 1952.

*Primary Examiner*—Lewis Gotts
*Assistant Examiner*—Cary B. Owens
*Attorney, Agent, or Firm*—Oblon, Fisher, Spivak, McClelland & Maier

[57] ABSTRACT

A process for removing the vitamin $B_2$ contained in whey by passing whey having a total solid content of from 6.2–25% through a column packed with granulated activated carbon derived from petroleum or coal in which more than 55% of the total pores have a diameter of from 40 to 200 A and the pore volume is more than 1.1 cc/g. The granulated activated carbon, saturated with vitamin $B_2$, can be regenerated by passing an aqueous solution of sodium hydroxide and water alternately therethrough for repeated use.

8 Claims, No Drawings

3,907,777

METHOD OF REMOVING VITAMIN B₂ FROM WHEY

BACKGROUND OF THE INVENTION

1. Field of the Invention

Lactoses obtained from whey have been widely utilized for the preparation of medicines and foodstuffs. The lactose is graded in order from pharmacopoeia lactose, edible lactose to lactose for fermentation depending upon the lactose content and extent of coloring. Pharmacopoeia lactose has the highest quality, is of high lactose content and white in color and is used as an excipient in order to form tablets. Therefore, it is desirable to prepare a lactose which is white and as high as possible in lactose content.

In the preparation of lactose from whey, the vitamin $B_2$ contained in whey (about 1 mg per 1 l of whey) tends to migrate to the lactose and thereby tends to impart a yellowish color to the lactose. Often, the whey powder utilized as a raw material for common foodstuffs is so intensely yellow colored that it results in only limited useability of the whey.

Therefore, a need exists for a simple procedure to remove the vitamin $B_2$ which causes the yellowing of whey, to economically obtain a high quality lactose product therefrom, and to obtain a pure-white whey powder.

2. Description of the Prior Art

Various processes for manufacturing refined lactose by removal of vitamin $B_2$ from whey are known and some of these processes are summarized at:

a. Lactose and its utilization: A review E.O. Whittier: Journal of Dairy Science, 27, 505, (1944);
b. Byproducts from milk, E.O. Whittier and B.H. Webb, 1st Edition, page 295, published by Reinhold Publishing Corporation, New York, 1950;
c. Recent progress in manufacture and use of lactose: A review. S.M. Weisberg: Journal of Dairy Science, 37, 1106, (1954);
d. Manufacture of refined lactose directly from whey, L. Schmidt, Dairy Science Abstracts, 20, 9216, (1958); and
e. Byproducts from milk, B.H. Webb and E.O. Whittier, 2nd Edition, page 356, published by The AVI, Publishing Company Inc., Westport, 1970.

The following principals can be summarized from this literature:

1. Activated carbon powder can be used in the manufacture of refined lactose;
2. Vitamin $B_2$ is adsorbable onto powdered activated carbon;
3. A whey solution can be heated to coagulate the protein contained therein and after the coagulated protein is removed a powdered activated carbon together with a filtering aid can be added to the solution. Alternately, the crude lactose fraction can be isolated from the whey and it can be dissolved in water followed by the addition of powdered activated carbon, together with a filtering aid, and then, the powdered activated carbon with adsorbed vitamin $B_2$ can be removed by filtration.

Therefore, none of the conventional methods described in the literature provide a method for the direct removal of vitamin $B_2$ from the whey or whey concentrate whereby a decolorized whey can be formed. Moreover, the prior art does not disclose any method whereby granular activated carbon can be used in a powdered state.

In addition, in the conventional methods for manufacturing refined lactose by the removal of vitamin $B_2$ using the direct addition of powdered activated carbon, it is very difficult to completely separate the protein from the whey because associates of fine powdered activated carbon and protein are formed. The vitamin $B_2$-adsorbed carbon should be discarded because of the difficulty of regeneration. Thus, the conventional methods for removal of vitamin $B_2$ are complicated in operation and expensive in cost.

SUMMARY OF THE INVENTION

Accordingly, one object of this invention is to provide a method of removing vitamin $B_2$ from whey or a whey concentrate.

Another object of this invention is to provide a method of removing vitamin $B_2$ directly from whey or a whey concentrate effectively and inexpensively.

Yet another object of this invention is to obtain refined lactose of high quality and to obtain a whey solution or a whey powder having a high additional value.

Yet another object of this invention is to completely remove vitamin $B_2$ from whey by passing the whey through a column packed with specific granular activated carbon without the previous removal of whey protein by heat coagulation.

Still another object of this invention is to spearate the vitamin $B_2$ adsorbed on the specific granulated activated carbon and regenerate the granulated activated carbon for further use.

Briefly, these and other objects of the invention as hereinafter will become apparent are achieved by passing the whey, used as raw materials for preparing lactose or common foodstuffs, through a column packed with a specific granulated activated carbon, which functions to adsorb the vitamin $B_2$ from the whey. The activated carbon containing the adsorbed vitamin $B_2$ is then regenerated using an alkali solution and water.

DETAILED DESCRIPTION OF THE PREFERRED EMBODIMENTS

According to the present invention, vitamin $B_2$ is removed from whey by passing whey having a total solid content of from 6.2 to 25% at a temperature of from less than 70°C to room temperature through a column packed with granulated activated carbon derived from petroleum or coal, in which more than 55% of the total of said carbon has a diameter of from 40 to 200 Å and the pore volume is more than 1.1 cc/g, whereby the vitamin $B_2$ is adsorbed from said whey by the activated carbon. The granulated activated carbon saturated with vitamin $B_2$ is then regenerated by alternate elution with an aqueous solution of sodium hydroxide and with water.

The present invention will be explained in greater detail as follows:

1. Decolorization and removal of vitamin $B_2$ from whey or a whey concentrate: The whey to be treated according to the present invention is fresh whey or a whey concentrate having a solid content of 25% or less prepared by evaporating fresh whey (6.2 to 6.3%) or a whey solution prepared by dissolving whey powder of high quality in water (hereinafter referred to as "whey").

If protein coagulates or other insoluble impurities exist in the whey, these substances may be previously removed from the whey by filtration or centrifugation, otherwise the granulated activated carbon layer may become clogged. It is advantageous to adjust the pH of the whey to below 7.0, and the temperature to below 70°C.

The reason for limiting the solid content of the whey to 25% or less is closely related to the temperature of the whey passing through the column. When the solid content of the whey is over 25%, the viscosity of the whey will be increased and thereby a pressure loss occurs in the column. This results in the fine pulverization of the granulated activated carbon by abrasion, causing a loss of the activated carbon and contamination of the final product by the activated carbon.

On the other hand, when the whey migrates through the column at a low temperature, and the solid content of the whey is above 25%, lactose readily crystallizes out resulting in the clogging of the column. Also, if a high temperature of from 60° to 70°C is used to lower the viscosity of the whey and prevent crystallization of the lactose when the solid content of whey is above 25%, then the whey protein coagulates readily, resulting in the clogging of the column.

Therefore, when passing whey through the column and taking into consideration of viscosity of the whey, crystallization of the lactose, coagulation of the whey protein, and the like, it is necessary to adjust the solid content of the whey and the temperature to below 25% and below 70°C, respectively. Usually, the solid content of the whey is selected to be in the range of from 6.2 –25%, by weight, and the temperature of whey being passed through the column is below 70°C to room temperature.

The reason for limiting the temperature to below 70°C is that, at a temperature of below 70°C, whey protein does not coagulate and the adsorption efficiency of the granulated activated carbon for vitamin $B_2$ is affected at this temperature.

In addition, when the pH is over 7.0, the adsorption efficiency of the granulated activated carbon for the vitamin $B_2$ in the whey is not satifactory. When the pH is above 9.0, vitamin $B_2$ can not be adsorbed by the granulated activated carbon. Also, from the viewpoint of flavor and subsequent handling of whey, the pH of the whey through the column is preferably adjusted to from 5.0 to 6.8.

2. Regeneration of the granulated activated carbon:

Vitamin $B_2$ in whey can be adsorbed by activated carbon. However, the degree of adsorption will vary greatly, depending upon the properties of the activated carbon used. The granulated activated carbon used in the present invention can be any commercially available granulated activated carbon or charcoal derived from petroleum or coal. Best results are attained when more than 55% of the pores of the carbon have diameters of from 40 to 200 A and the pore volume is more than 1.1 cc/g.

The reason for using the granulated activated carbon limited as described above is based on the specific affinity of granulated activated carbon for vitamin $B_2$ and on the facility of the granulated activated carbon to be regenerated to separate the vitamin $B_2$, with an aqueous alkali solution. The adsorptive ability of the activated carbon can be illustrated by the following experiments:

The amount of vitamin $B_2$ adsorbed into granulated activated carbon and that adsorbed onto granulated activated carbon regenerated with an aqueous alkali solution were determined on two kinds of granulated activated carbon different in pore size and pore volume. The results are as follows:

1. Properties of granulated activated carbon:

Two types (A and B) of commercially available granulated activated carbon used in the experiment had properties as shown in Table 1.

TABLE I

| | A<br>Granulated coconut husk carbon powder with binding agent | B<br>Granulated petroleum carbon with binding agent |
|---|---|---|
| 1. Total surface area, $M^2/g$ ($N_2$, BET method) | 950–1050 | 1200–1500 |
| 2. Apparent density, g/cc | 0.48 | 0.34 |
| 3. Particle density, g/cc (Mercury substitution method) | 0.75 | 0.49 |
| 4. True density, g/cc (Helium substitution method) | 2.1 | 1.9 |
| 5. Pore volume, cc/g | 0.85 | 1.2 |
| 6. Distribution of pore, % 40–200 A | about 22 | about 65 |
| 7. Particle size, % 8–30 meshes | about 87 | about 87 |
| 8. Average particle, mm diameter | 1.60 | 1.5 |

2. Amount of vitamin $B_2$ adsorbed:

Two glass columns (1.5 cm I.D., 14 cm height) respectively filled with 3 g of the above two kinds of granulated activated carbon were used and an aqueous vitamin $B_2$ solution was eluted therethrough under the following conditions and the amount of vitamin $B_2$ adsorbed was then determined.

Commercially available vitamin $B_2$ (riboflavin 5′-phosphate ester monosodium salt) was dissolved in water and adjusted to a concentration of 10 mg/100 ml. Two portions of 1 liter of this vitamin $B_2$ solution were eluted respectively through each of the two columns packed with the two kinds of granulated activated carbon at a temperature of 22°C with a space velocity of 30 V/V/hr and with a line velocity of about 1 to 1.5 m/hour.

After the vitamin $B_2$ solution had been completely eluted through the columns, the eluate from the column containing unadsorbed vitamin $B_2$ was collected and the column was finally rinsed with water in order to collect the solute which remained in the column. The eluate and the rinsed fluid were combined and the vitamin $B_2$ content in the mixture was determined. Thus, the amount of vitamin $B_2$ adsorbed onto the granular activated carbon was calculated by subtracting the amount of vitamin $B_2$ in the mixed solution from that in the original solution. That is,

| | Granular activated carbon | |
|---|---|---|
| | A | B |
| Amount of vitamin $B_2$ adsorbed onto 1 g of granular activated carbon | 24.3 mg/g | 52.1 mg/g |

3. Regeneration of the granulated activated carbon:

Next, 4% aqueous NaOH solutions and water were each passed four times alternately through both columns. Thereafter, the NaOH remaining in each column was neutralized with 0.1% HCL and then the columns were again washed with water. The regeneration was completed when the pH of the aqueous eluate from the column was confirmed to be below 7.0.

4. The second adsorption test of vitamin $B_2$:

In a procedure similar to (2) above, the re-adsorption test of vitamin $B_2$ onto granular activated carbon was performed. The result obtained by this test are as follows:

|  | Granular activated carbon | |
|---|---|---|
|  | A | B |
| Amount of vitamin $B_2$ readsorbed onto 1 g of granulated activated carbon | 7.6 mg/g | 42.4 mg/g |

5. The second regeneration of granulated activated carbon:

Similar to the procedure in (3) above, the granulated activated carbon saturated with vitamin $B_2$ in (4) was again regenerated.

6. The third adsorption test of vitamin $B_2$ by the regenerated granulated activated carbon:

After the regeneration of the granulated activated carbon was completed by a procedure similar to (2) above, the amount of vitamin $B_2$ adsorbed was again determined. The results are tabulated in the following table:

|  | Granulated activated carbon | |
|---|---|---|
|  | A | B |
| Amount of vitamin $B_2$ adsorbed onto 1 g of granulated activated carbon | 2.7 mg/g | 44.7 mg/g |

7. The fourth, fifth and sixth adsorption tests of the vitamin $B_2$ by the granulated activated carbon:

Similar adsorption tests for vitamin $B_2$, as described above, were repeatedly performed more than three times, i.e., the fourth, fifth and sixth tests. The results are summarized in Table II.

TABLE II

| Test | Amount of vitamin $B_2$ adsorbed by 1 g of granulated activated carbon | |
|---|---|---|
|  | A | B |
| 1st | 24.3 mg/g | 52.1 mg/g |
| 2nd | *7.6 mg/g | 42.4 mg/g |
| 3rd | 2.7 mg/g | 44.7 mg/g |
| 4th | 2.2 mg/g | 42.7 mg/g |
| 5th | 1.8 mg/g | 44.1 mg/g |
| 6th | 1.2 mg/g | 43.4 mg/g |

*In all the tests except the first test, 100 ml of an aqueous solution containing 10 mg of vitamin $B_2$ therein were passed through the column packed with granulated activated carbon A.

From the above described experimental results it is evident that granulated activated carbon A adsorbs only small amounts of vitamin $B_2$ and is very poor in regeneration efficiency with an alkali solution and water in comparison to granulated activated carbon B and, in contrast, granulated activated carbon B possesses not only a large vitamin $B_2$ adsorption capacity, but also shows about an 80% regeneration efficiency, which was calculated from the following equation, with an alkali solution and water:

$$\frac{\text{Amount of vitamin } B_2 \text{ adsorbed in the nth test}}{\text{Amount of vitamin } B_2 \text{ adsorbed in the 1st test}} \times 100$$

and, even in the fifth regeneration, the regeneration efficiency is almost constant and stable. It is therefore, concluded that the granulated activated carbon B is suitable as an adsorbent for effectively and economically removing vitamin $B_2$ in whey.

In order to effectively remove vitamin $B_2$ from whey according to the present invention, granulated activated carbon derived from petroleum carbon or coal carbon, preferably derived from petroleum carbon, in which more than 55% of the total pores have a pore diameter of from 40 to 200 A and a pore volume greater than 1.1 cc/g has proven to be suitable for use. The necessary conditions for increasing the amount of vitamin $B_2$ adsorbed by the activated carbon and regeneration of the activated carbon at a high efficiency are that the granulated activated carbon used is from petroleum or coal which has the aforesaid pore diameter and pore volume.

3. Treatment of whey with granulated activated carbon:

The above described whey was eluted through a column packed with the granulated activated carbon at a space velocity (volume of passing whey/ volume of granulated activated carbon/one hour, hereinafter abbreviated as S.V.) below 30 and at a line velocity (m/hour, hereinafter abbreviated as L.V.) below 90. The S.V. and L.V. values may vary depending upon the solid content of the whey. When the concentration is lower, higher values of S.V. and L.V. may be applied and the S.V. and L.V. values may be lower with a higher solid content.

However, in any case, the upper limits of the S.V. and L.V. values are 30 and 90, respectively when whey is eluted through a column. When the S.V. and L.V. values are higher than these values, the pressure loss in the column is large, the elution of pulverized activated carbon caused by abrasion results and the adsorption efficiency of vitamin $B_2$ is lowered because the contact time of the vitamin $B_2$ in the whey and the granulated activated carbon becomes less. When the S.V. and L.V. values are lower, the capacity for whey treatment is undesirably low. Accordingly, it is preferred that the whey has a solid content of 25% and is eluted through the column at a S.V. of 0.5 to 1 and at a L.V. of 2 3, thus these values correspond to the lowest limit of the elution velocity.

4. Decolorization of whey by the granulated activated carbon treatment:

Fresh whey usually contains vitamin $B_2$ in a concentration of about 100γ/100 ml. In the conventional method, 0.125 Kg of powdered activated carbon is required for the decolorization of 50 Kg of lactose; calculated in terms of fresh whey, this is about 10,000 to 12,000 times the weight of the powdered activated carbon (refer to literature (e), page 327 described above). Accordingly, the conventional method requires large quantities of powdered activated carbon which has to be discarded together with the filter aid thereby reducing the efficiency of the conventional process. Also, the disposal of the carbon and filter aid create pollution problems and additional steps are required to avoid the problem which also reduces the efficiency of the conventional method.

On the contrary, in the method of the present invention as described above, the whey is eluted through a column to remove the vitamin $B_2$ and the efficiency of the removal is very high. For example, according to the present invention the vitamin $B_2$ content contained in about 50 l of fresh whey having a solid content of 6.3% can be removed with only 1 g of granulated activated carbon. In other words, the granulated activated carbon used in the present invention is capable of decolorizing fresh whey in an amount of 50,000 times its own weight and the resulting solution is colorless, i.e., free of vitamin $B_2$. Even after eluting whey in an amount of 60,000 times the weight of the granulated activated carbon, one-third of the vitamin $B_2$ was adsorbed.

The method of the present invention is far more effective for removing vitamin $B_2$ from whey in comparison to the conventional method in which powdered activated carbon is used at the rate of 0.25 per 100 of lactose.

Therefore, according to the method of the present invention, whey, calculated in terms of fresh whey, in an amount corresponding to about 50,000 times that of granulated activated carbon can be eluted on the column to remove vitamin $B_2$ effectively, and thereafter the granulated activated carbon can be regenerated for subsequent repeated use.

5. Regeneration of the granulated activated carbon:

Another important feature of the present invention is that the above described granulated activated carbon saturated with vitamin $B_2$ can be easily regenerated for repeated use. Vitamin $B_2$ in whey has a relatively low molecular weight and has the property of being easily adsorbed by granulated activated carbon but, when once adsorbed, it is very difficult to separate the vitamin $B_2$ from the carbon. Therefore, a method for removing the vitamin $B_2$ adsorbed by the active carbon using an organic solvent and the like has been studied and disclosed in the Journal of the Indian Chemical Society, 11, 295 (1934). This method employs as a solvent to remove the vitamin $B_2$ methanol, pyridine and a hychloric acid mixture. However, it is not appropriate to use such regenerating agents when whey and lactose are to be used as foodstuffs and medicines.

A simple and economical method for separating the adsorbed vitamin $B_2$ from the granulated activated carbon and regenerating the activated carbon, has been found in which the granulated activated carbon derived from petroleum, and having more than 55% of its total pores with a pore diameter of 40 to 200 A and a pore volume above 1.1 cc/g, can be easily regenerated with a regenerating efficiency of about 80,% even after repeated adsorption and regeneration by eluting with an aqueous alkali solution and water alternately.

The mechanism by which the vitamin $B_2$ adsorbed by the above described granulated activated carbon having specific pore sizes is easily removed with an aqueous alkali solution and water is considered to involve a specific correlation between the molecular size of vitamin $B_2$, and the pore size and micro-structure of the granulated activated carbon and it is also assumed that it depends upon the difference in diffusion velocity of vitamin $B_2$ on the inside of the pores of the granulated activated carbon. Also, the concentration gradient of the alkali solution in the inside and outside of the pores is considered to be a factor in making the removal easier. That is, it is considered that, in case of eluting water through granulated activated carbon after the pores were filled with an alkali solution, a concentration gradient of alkali solution arises between the inside and the outside of the pores and the alkali solution flows out from the inside of pores and simultaneously the diffusion velocity of vitamin $B_2$ in the inside of pore is accelerated by the elution velocity of the alkali solution so that vitamin $B_2$ is separated from the granulated activated carbon.

On the contrary, when granulated activated carbon from coconut shell for example, is used in which less than 20% of the total pores have a diameter of from 40 to 200 A and the pore volume is below 1.0 cc/g, the amount of vitamin $B_2$ adsorbed is small and the regeneration efficiency is very poor as described in Experiment 1. The evidence that vitamin $B_2$ which was adsorbed by a column packed with granulated activated carbon of the present invention, to a saturated level can be dissociated and eluted from the column by means of rinsing alternately with a sodium hydroxide solution (5 w/w %) and water, is demonstrated in Experiment 1. It was observed that the vitamin $B_2$ adsorbed by the granulated activated carbon can be repeatedly removed 4 or 5 times from the granulated activated carbon in an amount corresponding to about 80% of that initially adsorbed.

The granulated activated carbon which was regenerated by this method can be used again in processing an amount of whey corresponding to about 40,000 times the weight of the granulated activated carbon and results in complete removal of the vitamin $B_2$ contained in the whey. The regenerated carbon can be repeatedly used.

Although a solution of any alkali, for example sodium hydroxide, potassium hydroxide, sodium carbonate, disodium phosphate, trisodium phosphate, or the like, can be used, sodium hydroxide is preferred from both economical and effectual viewpoints. Although the efficiency of regeneration is increased the higher the concentration of the aqueous sodium hydroxide solution is, the concentration is preferably within the range of from 2 to 10% in view of economy and results. Further, although the higher the temperature of alkali solution is, the more effective it is, 70° to 90°C is the preferred temperature range. is The effect obtained in the present invention can be summarized as follows:

1. Vitamin $B_2$ can be completely and directly removed from whey by passing it through a column packed with specific granulated activated carbon of the present invention without previous removal of whey protein by heat coagulation. The amount of vitamin $B_2$ which can be adsorbed and removed on unit weight of the activated carbon was above 4 times that obtainable when using conventional powdered activated carbon;

2. Since the granulated activated carbon can be prepacked into a column, for later utilization, the apparatus and operation are simple, which enable the installation of automatic and continuous removal of vitamin $B_2$ from whey;

3. The specific granulated activated carbon used in the present invention can be regenerated with an inexpensive alkali solution for repeated use. Therefore, there is no pollution problem. This is in favorable contrast to conventional methods which are pollution causing. The expense for removing vitamin $8_2$ per unit weight of whey according to the present invention, is much lower than conventional methods.

Vitamin $B_2$ is removed from whey through a procedure as described above, and the decolorized and refined whey obtained can be utilized for the preparation of refined lactose or "delactose" whey solution which may be dried to a powder of high protein content.

Lactose has been separated from whey by conventional crystallization methods. Whey is highly regarded from a nutritional standpoint, however, its utilization is limited because of its high ash content. Therefore, whey is generally desalted. It has now been found that it is very effective, if in the crystallization and desalting used to obtain refined lactose from whey, electrodialysis of the refined whey by an ion permselective membrane is performed before the crystallization. This is based upon the following:

1. The solid content concentration of desalted whey for the crystallization of lactose may be high, since the viscosity of the whey is lowered as a result of the desalting and, therefore, lactose is readily crystallized. The lactose can be obtained in yields of higher than 10 – 15% as compared with the conventional methods in which the crystallization is conducted without desalting.

2. One serious problem in the electrodialysis of whey by means of an ion permselective membrane is that coloring matters (for example, vitamin $B_2$) in whey are adsorbed by the anion permselective membrane thereby increasing its electric resistance, lowering its electrolytic efficiency and deteriorating the membrane, thereby resulting in a shortened life of the ion permselective membrane. This process eliminates such difficulties since the vitamin $B_2$ is removed. Therefore the desalting of the whey can be achieved very efficiently without the above disadvantage so that the life of the anion permselective membrane can be extended up to fifty times as compared to conventional methods.

PREPARATION OF REFINED LACTOSE

The concentration of the total solid content of the refined whey to be desalted is preferably adjusted to 20 to 25%. During the desalting treatment, the temperature of whey must be maintained at less than 70°C in order to prevent the whey protein from coagulating and lactose from crystallizing. The desalting of the refined whey is so performed to be at or above 50% in desalting rate. If the desalting rate is below 50%, the improvement in yield of lactose cannot be obtained in the subsequent concentrating step. The rate of desalting may vary from 50 to 90% depending upon the solid content.

The desalted whey is then generally concentrated to a solid content within the range of from 65 to 75%. The solid content is correlated with the desalting rate and the higher the desalting rate, the higher is the solid content which can be obtained in the concentrating step.

After concentration, the concentrated whey is cooled to below 65°C and seeded to accelerate the crystallization of lactose according to the conventional method. After seeding, the concentrated whey is further slowly cooled to crystallize the lactose. The concentrated whey, containing crystallized lactose, is then centrifuged to separate the lactose crystals, which are then washed with cold water, and dried to obtain a product of refined lactose.

Thus, by first desalting the refined whey, and thereafter concentrating it to crystallize the lactose, excellent yields of lactose are obtained since (1) the purity of the lactose obtained from the total solid content in the whey is high, (2) the association of calcium ion with a part of the lactose thereby retarding the crystallization of the lactose is decreased, and (3) the concentrated whey is low in viscosity due to the reduction in the concentration of inorganic salts and therefore the lactose is readily crystallizable.

The concentrated whey after lactose is crystallized exhibits and maintains good flowability even if chilled to a low temperature because of its low viscosity. In addition, the remaining decolorized, desalted and delactosed whey can be dried to produce a whey protein powder which is widely accepted by the food industry as a foodstuff.

Thus, white refined lactose of high purity which is useful for foodstuffs and medicines can be manufactured by an economical and efficient method.

Having generally described the invention, a more complete understanding can be obtained by reference to certain specific examples, which are included for purposes of illustration only and are not intended to be limiting unless otherwise specified.

EXAMPLE

1. Removal of vitamin $B_2$ from whey:

About 200 tons of a fresh whey solution from which insolubles have been removed and which has properties and composition as shown in Table III was prepared. About 1000 l (about 330 Kg) of granulated activated carbon derived from petroleum having the properties of the granulated activated carbon B in Table I was packed in stainless cylindrical column 1 meter in diameter and 2 m in height (i.e., about 1570 l in volume) and washed with water sufficiently to remove any fine powders of activated carbon.

The above whey solution adjusted to 10°C was eluted through this column at a S.V. = 20 and a L.V. = 25.4 to obtain about 200 tons of whey solution free from vitamin $B_2$. The vitamin $B_2$ content of the eluted whey solution after being eluted through the granulated activated carbon column was determined to be zero by the conventional method although 1.09 mg/l was determined to be present in the whey solution before elution through the column.

TABLE III

| Properties and compositions of whey solution | |
|---|---|
| Fat | 0.05% by weight |
| Protein | 0.70% by weight |
| Lactose | 4.65% by weight |
| Ash content | 0.70% by weight |
| Solid content | 6.10% by weight |
| Vitamin $B_2$ content | 109γ/100 ml |
| pH | 6.4 |

2. Preparation of refined lactose:

The refined whey solution so obtained was then pasteurized by heating at 75°C for 10 minutes and, thereafter, concentrated by means of a conventional plate type concentrator to obtain about 60 ton of whey solution having a solid content of 20%. This concentrated whey solution was then subjected to an ion permselective membrane electrodialysis according to the conventional method to remove about 70% of the ash. The properties of the decolorized and desalted whey solution after removing 70% of ash are shown in Table IV.

TABLE IV

| Properties of decolorized and desalted whey solution | |
|---|---|
| Fat | 0.16% by weight |
| Protein | 2.36% by weight |
| Lactose | 15.30% by weight |
| Ash content | 0.68% by weight |
| Solid content | 18.40% by weight |
| Vitamin $B_2$ content | none detected |
| pH | 6.2 |

The whey solution after being decolorized and desalted was further concentrated to a solid content of about 72% according to the conventional method. Subsequently, the concentrated whey solution was placed into a crustallization tank in which a crystalline nucleus of lactose was seeded at 56°C, and, thereafter, cooled slowly to 27°C under stirring and held at 27°C for about 36 hours to sufficiently crystallize the lactose. The viscosity of the concentrated whey solution containing lactose crystals was about 1,260 c.p.

Next, the concentrated whey solution containing lactose crystals was centrifuged at about 600 rpm (about 600 G) by means of a basket type of centrifugal separator to separate the lactose from the whey. The lactose crystals so centrifuged were washed with cold water at about 7°C for 1 minute, centrifuged at about 1200 rpm (1200 G) to remove water and then dried at 84°C by means of a conventional bed drier to a water content below 0.5%. About 7250 Kg of refined lactose having the composition as shown in Table V was obtained.

TABLE V

| | |
|---|---|
| Lactose | 99.5% by weight |
| Moisture content | 0.3% by weight |
| Protein (N ×6.38) | 0.08% by weight |
| Ash content | 0.02% by weight |
| Acid value (as lactic acid) | 0.05% by weight |

The total vitamin $B_2$ of the above described refined lactose was determined according to the conventional method and no vitamin $B_2$ was detected.

The decolorized, desalted and delactosed whey solution was dried according to the conventional method to obtain a decolorized, desalted and delactosed whey powder of high protein content.

Having now fully described in invention, it will be apparent to one or ordinary skill in the art that many changes and modifications can be made thereto without departing from the spirit or scope of the invention as set forth herein.

What is claimed as new and intended to be covered by letters patent is:

1. A method for removing a vitaimn $B_2$ from whey which consists essentially of eluting whey having a total solid content of not more than 25%, through porous granulated activated carbon, derived from petroleum or coal, in which more than 55% of the total pores of said carbon have a diameter of from 40 to 200 A and a pore volume greater than 1.1 cc/g to adsorb the vitamin $B_2$ onto the carbon.

2. The process of claim 1 wherein the whey is at a temperature of from room temperature to 70°C.

3. The process of claim 1, wherein the vitamin $B_2$ is separated from the granulated activated carbon by alternatively washing the carbon with an aqueous alkali solution and water.

4. The process of claim 1, wherein the whey has a pH of less than 7.

5. The process of claim 1, wherein the whey has a total solid content of from 6.2 to 25%.

6. The process of claim 1, wherein the carbon is granulated activated carbon derived from petroleum.

7. The process of claim 3, wherein the aqueous alkali solution is sodium hydroxide.

8. The process of claim 5, wherein the effluent whey is free from vitamin $B_2$.

* * * * *